(12) United States Patent
D'Souza et al.

(10) Patent No.: US 12,523,682 B2
(45) Date of Patent: Jan. 13, 2026

(54) IDENTIFYING FAULTS IN A TRANS-INDUCTOR VOLTAGE REGULATOR

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 217 days.

(21) Appl. No.: 18/482,919

(22) Filed: Oct. 9, 2023

(65) Prior Publication Data
US 2024/0125825 A1    Apr. 18, 2024

(30) Foreign Application Priority Data

Oct. 14, 2022   (IN) .............................. 202241058856

(51) Int. Cl.
  *G01R 19/165*   (2006.01)
  *H02M 1/32*     (2007.01)
  *H02M 3/155*    (2006.01)
(52) U.S. Cl.
  CPC ........ *G01R 19/16571* (2013.01); *H02M 1/32* (2013.01); *H02M 3/155* (2013.01)
(58) Field of Classification Search
  CPC .... H02M 1/32; H02M 3/155; G01R 19/16571
  See application file for complete search history.

(56) References Cited

U.S. PATENT DOCUMENTS 9,621,045 B2      4/2017  Tang et al.
2022/0109368 A1*  4/2022  Zhou ................... H02M 3/1586
(Continued)

FOREIGN PATENT DOCUMENTS

CN    110808685 A    2/2020
CN    114355235 A    4/2022
(Continued)

OTHER PUBLICATIONS

Demystifying dual winding TLVR inductors, https://www.eaton.com.cn/content/dam/eaton/products/electronic-components/resources/technical/eaton-tlvr-white-paper-elx1160-en.pdf, Eaton TLVR inductors white paper, Mar. 2022, 04 pages, Eaton Electronics Division, United States.
(Continued)

*Primary Examiner* — Rafael O De Leon Domenech
(74) *Attorney, Agent, or Firm* — IPHORIZONS PLLC; Narendra Reddy Thappeta (57) ABSTRACT

Faults in the secondary-loop of a trans-inductor voltage regulator (TLVR) are detected. Each power stage of the TLVR is connected to a primary winding of a respective transformer in the TLVR. The secondary windings of the transformers and a compensation inductor form a secondary-loop. A phase controller in the TLVR operates to both drive a first power stage to an ON state and to place a second power stage in an OFF state in a first duration. In the first duration, if the first power stage draws a current less than a maximum threshold and if a voltage at the switching node of the second power stage is negative, the phase controller determines that no faults exist in the series secondary circuit. Otherwise, the phase controller determines that one or more faults exist in the series secondary circuit.

10 Claims, 8 Drawing Sheets

(56) References Cited

U.S. PATENT DOCUMENTS

| | | | |
|---|---|---|---|
| 2022/0216788 A1 | 7/2022 | Chang et al. | |
| 2022/0376600 A1 | 11/2022 | Jong et al. | |
| 2023/0194625 A1* | 6/2023 | Zafarana | H02M 3/1586 324/764.01 |

FOREIGN PATENT DOCUMENTS

| | | |
|---|---|---|
| CN | 115133790 A | 9/2022 |
| CN | 115308646 A | 11/2022 |
| EP | 3979482 A1 | 4/2022 |
| EP | 4109729 A1 | 12/2022 |

OTHER PUBLICATIONS

Nian Zhang et al., Analysis of Multi-Phase Trans-Inductor Voltage Regulator with Fast Transient Response for Large Load Current Applications, May 14, 2021, 5 Pages, 2021 IEEE International Symposium on Circuits and Systems (ISCAS).

XDPE15254D Digital Multi-phase Controller, Mar. 18, 2022, 07 Pages, Infineon Technologies AG 81726 Munich, Germany.

Smart Power Stage (SPS) Module with Integrated High Accuracy Current and Temperature Monitors, Oct. 2, 2017, 17 pages, RENESAS.

Fast multi-phase trans-inductor voltage regulator, May 9, 2019, 15 Pages, Technical Disclosure Commons, 2019.

Yasuhiro Sugimoto, Feedback Loop Analysis and Optimized Compensation Slope of the Current-Mode Buck DC-DC Converter in DCM, Jan. 2015, 09 Pages, vol. 62—Issue No. 01, IEEE Transactions on Circuits and Systems.

Shreyankh Krishnamurthy, Trans-Inductor Voltage Regulator (TLVR): Circuit Operation, Power Magnetic Construction, Efficiency and Cost Trade-Offs, May 10-12, 2022, 06 Pages, University of Petroleum & Energy Studies.

* cited by examiner

| | FAULT/NO FAULT | PH1_OC | PH2_SWN | PH2_OC | PH1_SWN |
|---|---|---|---|---|---|
| PH1 is Driven PH2 is HiZ | No faults (380A) | No | Yes | N/A | N/A |
| | Faulty TLVR (380B) | Any other combination | | | |
| PH2 is Driven PH1 is HiZ | No faults (390A) | N/A | N/A | No | Yes |
| | Faulty TLVR (390B) | Any other combination | | | |

IDENTIFYING FAULTS IN A TRANS-INDUCTOR VOLTAGE REGULATOR

PRIORITY CLAIM

The instant patent application is related to and claims priority from the co-pending India provisional patent application entitled, "TLVR Open and Short Detection", Serial No.: 202241058856, Filed: 14 Oct. 2022, which is incorporated in its entirety herewith to the extent not inconsistent with the description herein.

BACKGROUND

Technical Field

Embodiments of the present disclosure relate generally to trans-inductor voltage regulators, and more specifically to identifying faults in a TLVR.

Related Art

A voltage regulator refers to a component that generates a regulated DC (direct current) voltage from an input supply voltage, as is well known in the relevant arts. Voltage regulators may be linear voltage regulators or switching voltage regulators (switching converters), as is also well known in the relevant arts.

A switching converter often employs multiple power stages, which together generate the regulated DC voltage. Each power stage generates a corresponding part of the requisite load current in a respective phase of a sequence of phases, and thus such a switching converter is referred to as a multi-phase switching converter.

A trans-inductor voltage regulator (TLVR) refers to a type of multi-phase switching converter in which each power stage is coupled with a corresponding transformer (known as 'trans-inductor') with a respective primary winding and a secondary winding. The secondary windings of the transformers of power stages are all connected in series with a compensation inductor. TLVRs find use in several environments including datacenters, storage systems, graphics cards and personal computing devices. In general, TLVRs may be employed in systems in which very fast response to load-current transients is desirable.

There are often scenarios when a TLVR is not operative as desired due to faults in its components. Faults refer to situations in which the terminals of the components are not physically and electrically coupled appropriately for desired communication/signaling. Faults can occur due to reasons such as human errors, wear and tear, defective components, etc. Faults can lead to improper operation of the corresponding power stage, damage and malfunction of various other components of the TLVR or devices using the TLVR. It is therefore desirable to detect and take appropriate action upon occurrence of such faults.

Aspects of the present disclosure are directed to identifying faults in a TLVR.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Aspects of the present disclosure are directed to identifying faults in a multi-phase trans-inductor voltage regulator (TLVR). The TLVR contains a phase controller, a compensation inductor, transformers and power stages (SPS). Each SPS is connected to one end of a primary winding of a respective transformer, with the other end of the primary winding being connected to a supply node. The secondary windings of the transformers and the compensation inductor form a series secondary circuit (secondary-loop) between a pair of constant reference potential terminals. The phase controller operates to both drive a first power stage to an ON state and to place a second power stage in an OFF state in a first duration. In the first duration, if the first power stage draws a current less than a maximum threshold and if a voltage at the switching node of the second power stage is negative, the phase controller determines that no faults exist in the secondary-loop. Otherwise, the phase controller determines that one or more faults exist in the secondary-loop.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
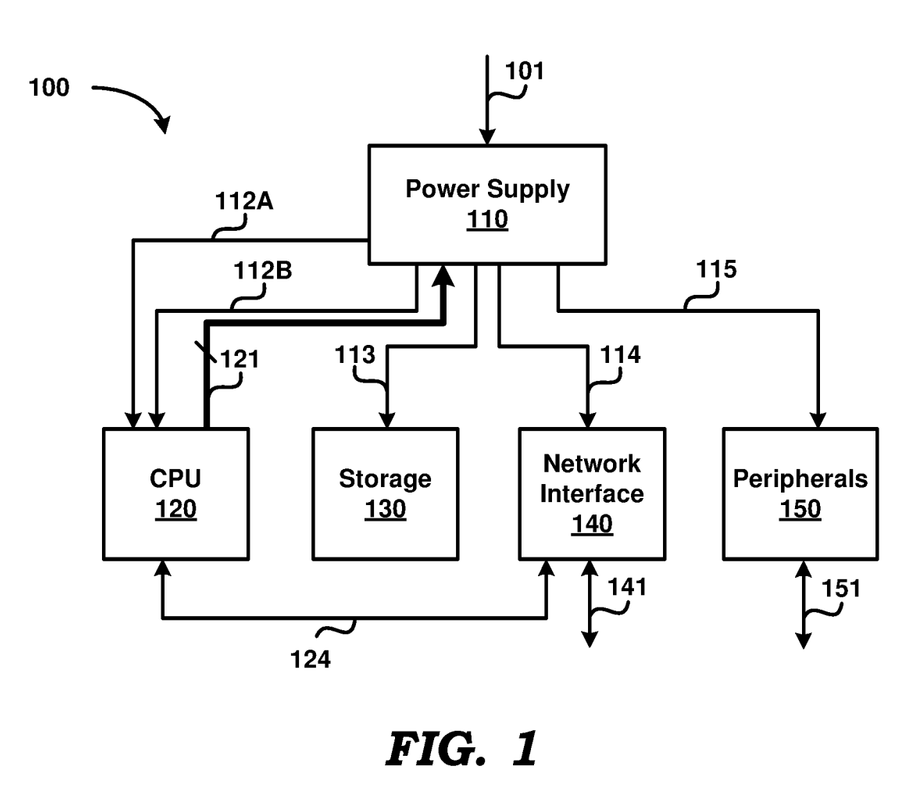
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific power-save state in which the device/component (e.g., a processor) is currently operating in (in terms of power consumption), such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general Internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase current output based on the specific signal (e.g., PS1, PS2 and PS3).

In an embodiment, power supply 110 is a multi-phase trans-inductor voltage regulator (TLVR), sometimes also called processor power module (PPM), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a TLVR, multiple devices/ICs requiring different supply voltages can be mounted on the same platform, for example, a computer motherboard of a personal computer (PC). Accordingly, the description is continued with respect to a TLVR as shown in FIG. 2.

3. Trans-Inductor Voltage Regulator (TLVR)

Figure 2:
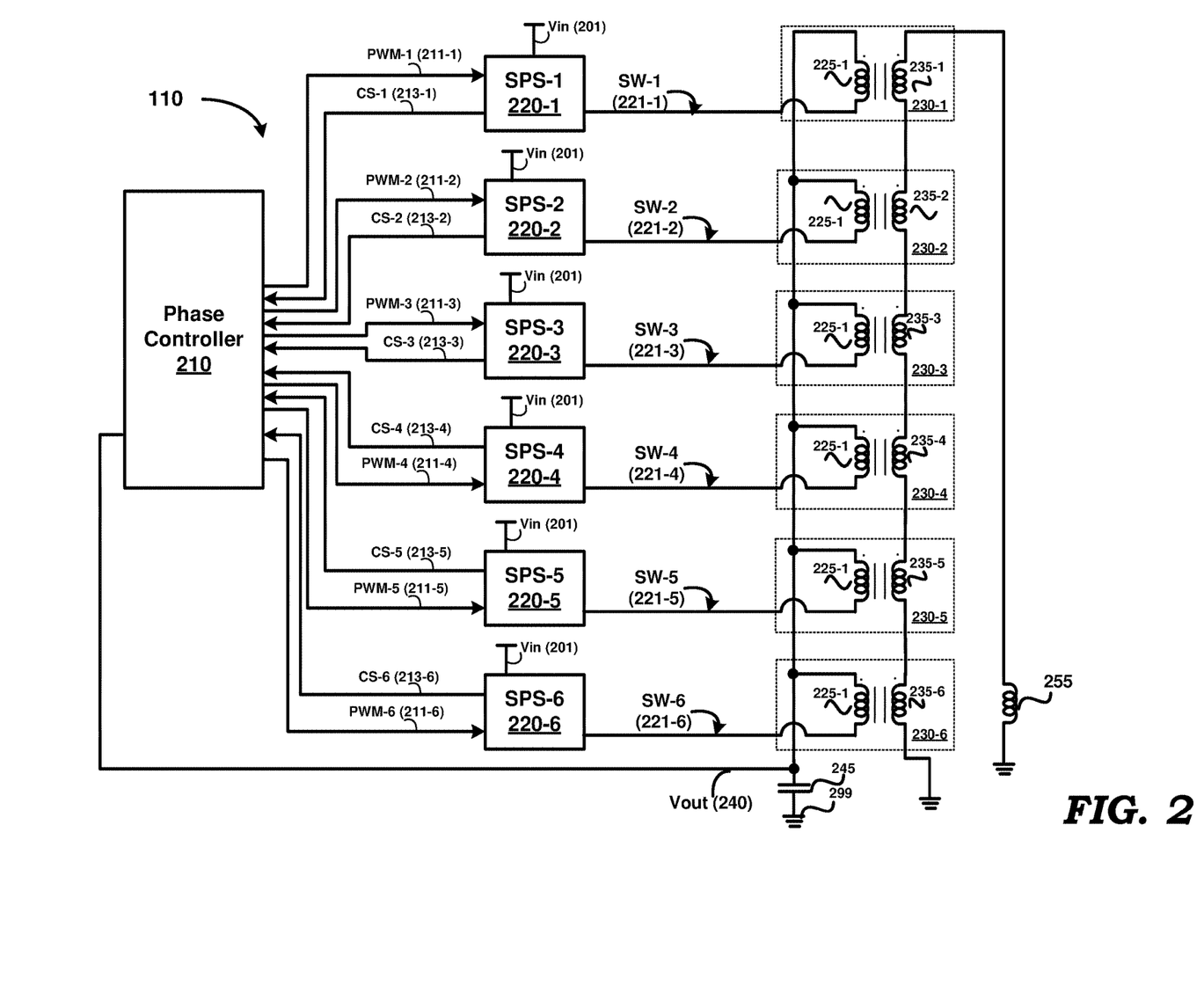
FIG. 2 is a block diagram illustrating the details of a trans-inductor voltage regulator (TLVR) in an embodiment of the present disclosure.

FIG. 2 is a block diagram illustrating the details of a Trans-inductor Voltage Regulator (TLVR) in an embodiment of the present disclosure. Power supply 110 is implemented as a TLVR (110) and is shown containing phase controller 210, smart power stages (SPS/'power stages') SPS-1 (220-1) through SPS-6 (220-6), transformers 230-1 through 230-6, compensation inductor 255 and capacitor 245. Power stages 220-1 through 220-6, transformers 230-1 through 230-6 are collectively or individually referred by respective reference numerals 220 and 230, as will be clear from the context. Similar convention is followed for other blocks/components/signals/nodes throughout the disclosure.

Power supply Va (240) is shown generated by a 6-phase TLVR (there are six SPSes—220-1 through 220-6). Node/path 240 corresponds to path 112A of FIG. 1. Although not shown in FIG. 2, power supply Vb (250) (corresponding to path 112B) of FIG. 1 may similarly be generated by, for example, a 3-phase TLVR. In the interest of conciseness, other power supply circuits that generate supplies on paths 113, 114 and 115 are not shown in FIG. 2.

Phase controller 210 performs regulating functions to enable the generation of regulated voltage Vout (240). Accordingly, Vout (240) is shown as being provided as input to phase controller 210, to enable operation of one or more feedback loops within phase controller 210 to regulate Vout (240). Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

According to aspects of the present disclosure, phase controller 210 in combination with one or more power stages operates to detect faults in the secondary-loop of TLVR 110. Accordingly, phase controller 210 receives signals from the power stage(s) indicating conditions indicative of such faults. The signals may be received on the corresponding current-sense (CS) pin, PWM pin or other pins/paths (not shown).

The combination of (corresponding circuitry within) phase controller 210, an SPS, and the corresponding transformer forms one "phase" of each multi-phase TLVR. Thus, for example, SPS-1, transformer 230-1, and the corresponding portion within phase controller 210 represent one phase of the 6-phase TLVR. It is noted here that, while each transformer is shown as a separate component (e.g., 230-1), in another embodiment, only a single larger module (containing multiple transformers) may be employed.

Each SPS may be implemented to contain a high-side switch, a low-side switch, gate-drive circuitry for the two switches, current-sense block and other circuits (not shown). An example of such 'other circuits' includes, but is not limited to, a temperature-monitor circuit to measure temperature of the SPS and to provide the temperature to phase controller 210. The current-sense block of an SPS measures/senses and/or estimates the magnitude of inductor-current through the inductor of that phase, and provides such inductor-current information to phase-controller 210.

Each SPS receives a source of power as an input which is connected to the high-side switch (shown in detail in sections below). In FIG. 2, the supply source is numbered 201, and has a voltage Vin. Typical value of Vin in a VRM is about 21 volts (V). Each SPS may also receive bias voltage Vcc (not shown) provided by a voltage regulator (not shown, but which may be within phase controller and separate from the switching regulators and SPSes of FIG. 2) or from a source external to the TLVR.

Each SPS communicates with phase controller 210 via corresponding signals PWM and CS. Thus, SPS-1 is shown connected to phase controller 210 through signal/paths PWM-1 (211-1) and CS-1 (213-1). SPS-6 communicates with phase controller 210 via signals PWM-6 (211-6) and CS-6 (213-6). The other SPSes would have similar connections with phase controller 210. Only those signals as relevant to the understanding of the disclosure are depicted in FIG. 2. There may be other communication signals between phase controller 210 and SPSes 220, such as a TMP signal (an output from an SPS to phase controller 210, providing information regarding the temperature in the SPS), a SYNC signal (input to an SPS and may be used by phase controller 210 for the purposes of waking-up the SPS upon power-up of the power supply 110, and also to indicate the power-mode (e.g., PS2, PS3)), etc.

Signal PWM is an input to an SPS and is a pulse-width modulated (PWM) signal. Signal PWM is a fixed-frequency, variable duty-cycle signal, although its frequency is potentially modifiable by phase controller 210 based on various operating considerations such as, for example, load-current demand. Thus, instead of a PWM signal, a pulse-frequency modulated (PFM) signal can also be used in various embodiments of the present disclosure. A cycle/period of signal PWM consists of a first interval in which only the high-side (HS) switch of SPS is switched ON, and a second interval in which only the low-side (LS) switch of the SPS is switched ON. The PWM signal (or more typically, drive signals derived from the PWM signal) controls the opening and closing of high-side switch and low-side switch of the SPS. The duty cycle of the PWM signal is set by phase controller 210 and is designed to generate the desired power supply voltage and/or control/change the current supplied by that phase. For example, PWM-1 would have a duty cycle as required for the magnitude of Vout (240) and the current to be provided by SPS-1. As is well known in the relevant arts, the PWM signals to each SPS of a same multi-phase voltage regulator are staggered, i.e., delayed with respect to each other in phase such that typically no two high-side switches (and possibly low-side switches also) in the converter (i.e., respective SPSes) will be overlapping. Such a technique is employed for reasons such as, for example, to ensure that the peak instantaneous current drawing from Vin is relatively low at all times.

In an embodiment, signal PWM represents a signal that may be of a fixed frequency but variable duty-cycle, and whose frequency is potentially modifiable by phase controller 210 based on load-current demands. When logic LOW is detected by the SPS on signal PWM, the low-side switch is turned ON, and when logic HIGH is detected on signal PWM, the high-side switch is turned ON. A high-impedance (hi-Z) value on signal PWM is designed to turn OFF both the high-side and the low-side switches of the corresponding SPS. In an embodiment of the present disclosure, a hi-z is indicated by a voltage that is approximately midway between the voltages corresponding to logic HIGH and logic LOW.

Signal CS (current sense) is an input to phase controller 210 from an SPS, and contains information regarding the magnitude of the inductor-current of that phase/SPS. The information can be in the form of a current, voltage, digital values, etc.

Each SPS is coupled to a respective transformer 230 having a primary winding 225 and a secondary winding 235. Thus, SPS-1 (220-1) is shown coupled to transformer 230-1 having primary winding 225-1 and secondary winding 235-1. Primary winding 225 of each transformer is shown connected between switching node SW (221) of the corresponding SPS and node 240 (Vout). The secondary windings of transformers of all SPSes are connected in series between ground (299) and one end of compensation inductor 255. The other end of compensation inductor is connected to ground (299). Thus, the secondary windings of the transformers, the compensation inductor and the respective connections form a series secondary loop, which is referred to herein as 'secondary-loop'.

The series connection of secondary windings of the transformers enables faster transient response to changes in load current, as is well known in the relevant arts. The primary and secondary winding of each transformer may be tightly coupled (with a coupling coefficient of close to unity). The primary to secondary turns ratio may typically be 1:1 (or higher). Compensation inductor 255 is designed such that an optimal trade-off between transient performance and loop stability of TLVR is achieved, as is well known in the relevant arts. Although transformers 230 are shown connected external to each SPS, in alternative embodiments, the primary and secondary windings of each transformer can be part of the corresponding SPS also, as would be apparent to a skilled practitioner without departing from the scope and spirit of the present disclosure.

In operation, current flowing through the primary winding of a transformer of an SPS induces an emf, and therefore a current, in the corresponding secondary winding. The induced current in turn flows through secondary windings of transformers of the other SPSes as well as the compensation inductor due to the series connection noted above. As a result, currents are induced in the primary windings of the other SPSes also.

However, due to the series connection of secondary windings, a fault in the secondary winding of one or more phases of the TLVR or the compensation inductor may lead to malfunctioning of the corresponding SPS (es) as well as the TLVR as a whole. For example, due to reasons such as human error, poor/improper soldering, vibration etc., there is a likelihood of faults. The fault(s) may be due to open-circuits or short-circuits in the secondary-loop. Thus, there may be faults such as an open secondary winding of a transformer or shorted secondary winding (the nodes between which a secondary winding would normally be connected are connected electrically with little or zero resistance due to some other defect) or the two ends of compensation inductor 255 are shorted (compensation inductor is itself a short or short/low-resistance due to some other defect). Such faults, if left undetected/untreated, may result in damage to the corresponding SPS and TLVR 110.

It is therefore desirable to identify faults in the secondary-loop of a TLVR and indicate such faults to an external component/user for initiating corrective action. According to aspects of the present disclosure, phase controller 210 in combination with two or more power stages of TLVR 110 operates to detect such faults.

The manner in such fault(s) may be detected according to aspects of the present disclosure is described below with examples.

4. Fault-Detection

Figure 3A:
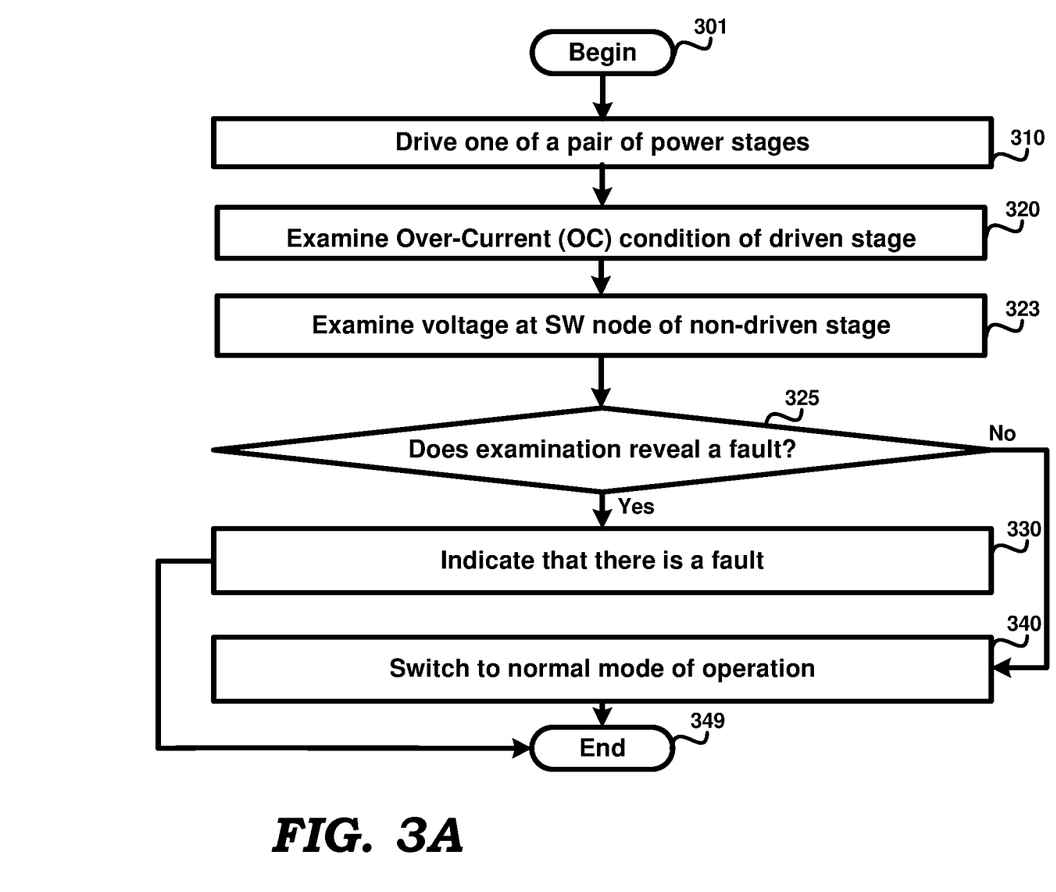
FIG. 3A is a flow-chart illustrating the manner in which faults in a TLVR are identified, according to an aspect of the present disclosure.

FIG. 3A is a flowchart illustrating the manner in which faults in the secondary-loop of a TLVR are identified, according to an aspect of the present disclosure. In the interest of clarity and conciseness, the description of the first flowchart is provided in the context of a TLVR that has only two power stages. Accordingly, the description of the steps of the flowchart assumes that TLVR 110 has only two SPS (e.g., SPS-1 and SPS-2) and the corresponding transformers plus the compensation inductor. However, the features described herein can be implemented in a TLVR with fewer or more than two power stages without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flowchart begins in step 301, in which control immediately passes to step 310.

In step 310, phase controller 210 drives one of a pair of power stages to operate in a fault-detection mode. In an embodiment, such driving entails setting the PWM signal provided to the driven stage to a logic HIGH for a first pre-determined time duration and the PWM signal of the second power stage of the pair to a high-impedance (hi-Z) state (non-driven state) for a second pre-determined time duration. The first and second pre-determined time durations may be the same or at least substantially overlapping. In an embodiment, both the durations are the same. Control passes to step 320.

In step 320, phase controller 210 examines if the driven stage has an over-current (OC) condition in the first pre-determined time duration. An OC condition refers to a condition in which the current supplied by the driven stage exceeds a predetermined maximum threshold. Control then passes to step 323.

In step 323, phase controller 210 examines if the voltage at a switching (SW) node of the non-driven stage is negative in the second pre-determined duration. The SW node refers to the junction node between the high-side and low-side switches of the stage. Control passes to step 325.

In step 325, phase controller 210 evaluates the results of the examinations of each of steps 320 and 323 to determine if a fault exists in the secondary-loop of the TLVR or not. In an embodiment, if there is no OC condition in the driven stage and the voltage at the SW node of the non-driven stage is negative, phase controller 210 concludes that there are no faults in the secondary-loop and control passes to step 340. However, if either there is an OC condition or the SW node is non-negative, then phase controller 210 concludes that a fault exists in the secondary-loop, and control passes to step 330.

In step 330, phase controller 210 indicates that there is a fault in the secondary-loop. Thus, phase controller 210 may activate an audio or visual signal to indicate a fault to a user. The user may then take corrective action to correct the fault. Control then passes to step 349, in which the flowchart ends.

In step 340, phase controller 210 switches the TLVR to the normal mode of operation to generate the desired regulated supply voltage on node Vout (240). Control then passes to step 349, in which the flowchart ends.

Figure 3B:
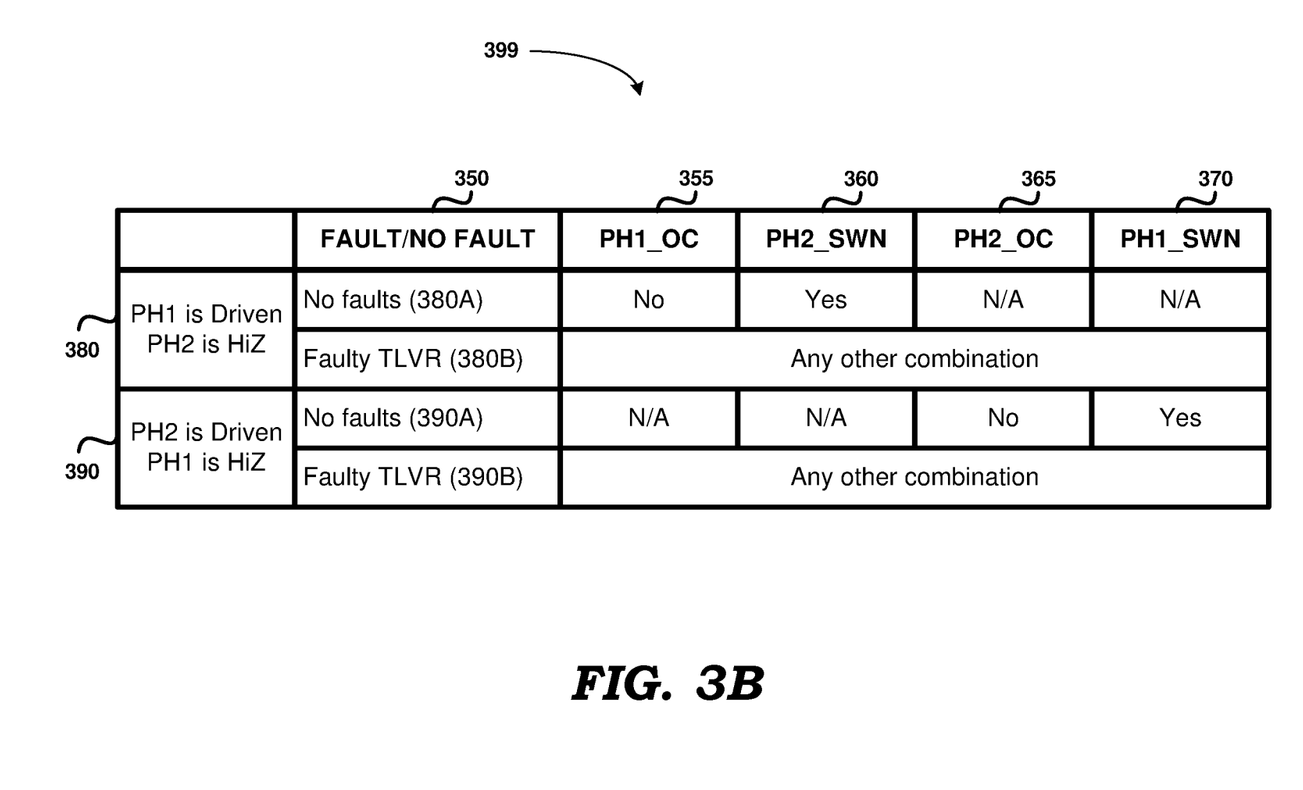
FIG. 3B is a table noting conditions in a pair of power stages under fault and no-fault conditions, in an embodiment of the present disclosure.

The operations of the steps noted above are illustrated further with reference to table 399 of FIG. 3B. Cells in row 380 indicate various conditions specified under columns 350 (FAULT/NO FAULT), 355 (PH1_OC), 360 (PH2_SWN), 365 (PH2_OC) and 370 (PH1_SWN) when a first power stage (PH1) is driven and a second power stage (PH2) is non-driven. Cells in row 390 indicate the same conditions when the second power stage (PH2) is driven and the first power stage (PH1) is non-driven. Row 380 is shown with sub-rows 380A and 380A respectively for entries for conditions 'No Faults' (380A) and 'Faulty TLVR' (380B) when PH1 is driven and PH2 is non-driven. Similarly, row 390 is shown with sub-rows 390A and 390B respectively for entries for conditions 'No Faults' (390A) and 'Faulty TLVR' (390B) when PH2 is driven and PH1 is non-driven. The entries in respective columns PH1_OC, PH2_SWN, PH2_OC and PH1_SWN respectively refer to presence (YES) or absence (NO) of an over-current state of the corresponding power stage, negative voltage (YES) at SW node or non-negative voltage (No) of the corresponding power stage, 'N/A' (not-applicable) and 'Any other combination'. The entries 'Any other combination' refer to any combination of conditions for the corresponding driven and non-driven stages other than 'no over-current condition' for the driven stage and 'SW voltage is negative' for the non-driven stage.

With PH1 driven and PH2 non-driven (row 380), if there is no over-current in PH1 and if the voltage at SW node of PH2 is negative, then phase controller 210 concludes that there are no faults (sub-row 380A). For any other set of conditions of PH1_OC and PH2_SWN, phase controller 210 concludes that there is a fault in the TLVR. As an example, the set of conditions PH1_OC is a NO and PH2_SWN is also a NO, phase controller 210 would conclude that a fault exists. As indicated in sub-row 380A, PH2_OC and PH1_SWN are not relevant and hence noted as 'N/A'.

Similarly, with PH2 driven and PH1 non-driven (row 390), if there is no over-current in PH2 and if the voltage at SW node of PH1 is negative, then phase controller 210 concludes that there are no faults (sub-row 390A). For any other conditions of PH2_OC and PH1_SWN, phase controller 210 concludes that there is a fault in the TLVR. As an example, the set of conditions PH2_OC is a YES and PH1_SWN is also a YES, phase controller 210 would conclude that a fault exists. As indicated in sub-row 390A, PH1_OC and PH2_SWN are not relevant and hence noted as 'N/A'.

Thus, by operating a pair of power stages to be each driven and non-driven alternately and observing the conditions described above, faults in the secondary-loop of a TLVR can be detected. It is noted here that a particular fault in the secondary loop may not manifest, and therefore may not be detectable, if fault conditions are sensed with only one of the pair of stages being driven and the other non-driven. For example, an over-current condition on a non-driven stage cannot occur and thus marked N/A in table 399. Hence, as noted above, phase controller 210 drives the two power stages alternately, maintaining the other power stage in a non-driven stage. By operating the two stages in such a manner, phase controller 210 is able to uncover faults which may otherwise not be detectable.

For a larger number of power stages, phase controller 210 may employ similar approaches as described above to detect one or more faults. In general, phase controller 210 may be operated to drive one or more stages/phases of TLVR 110 (in parallel or one after the other) to initiate current in the secondary-loop. On the non-driven phases, phase controller 210 senses if the voltages at the corresponding SW nodes are negative. On the driven phase(s), phase controller 210 senses if an over-current condition exists. Based on the above operations, phase controller 210 identifies a wide variety of faults in TLVR 110. Some examples of fault conditions that can be detected by phase controller 210 are 'secondary winding of a stage is open', 'secondary winding of a stage is a short' and 'compensation inductor is an open or a short'.

The manner in which phase controller 210 determines presence or absence of faults is illustrated with example circuits and waveforms in sections below.

The implementation details of an SPS to facilitate fault-detection in an embodiment of the present disclosure are provided next.

5. Smart Power Stage (Power Stage/SPS)

Figure 4:
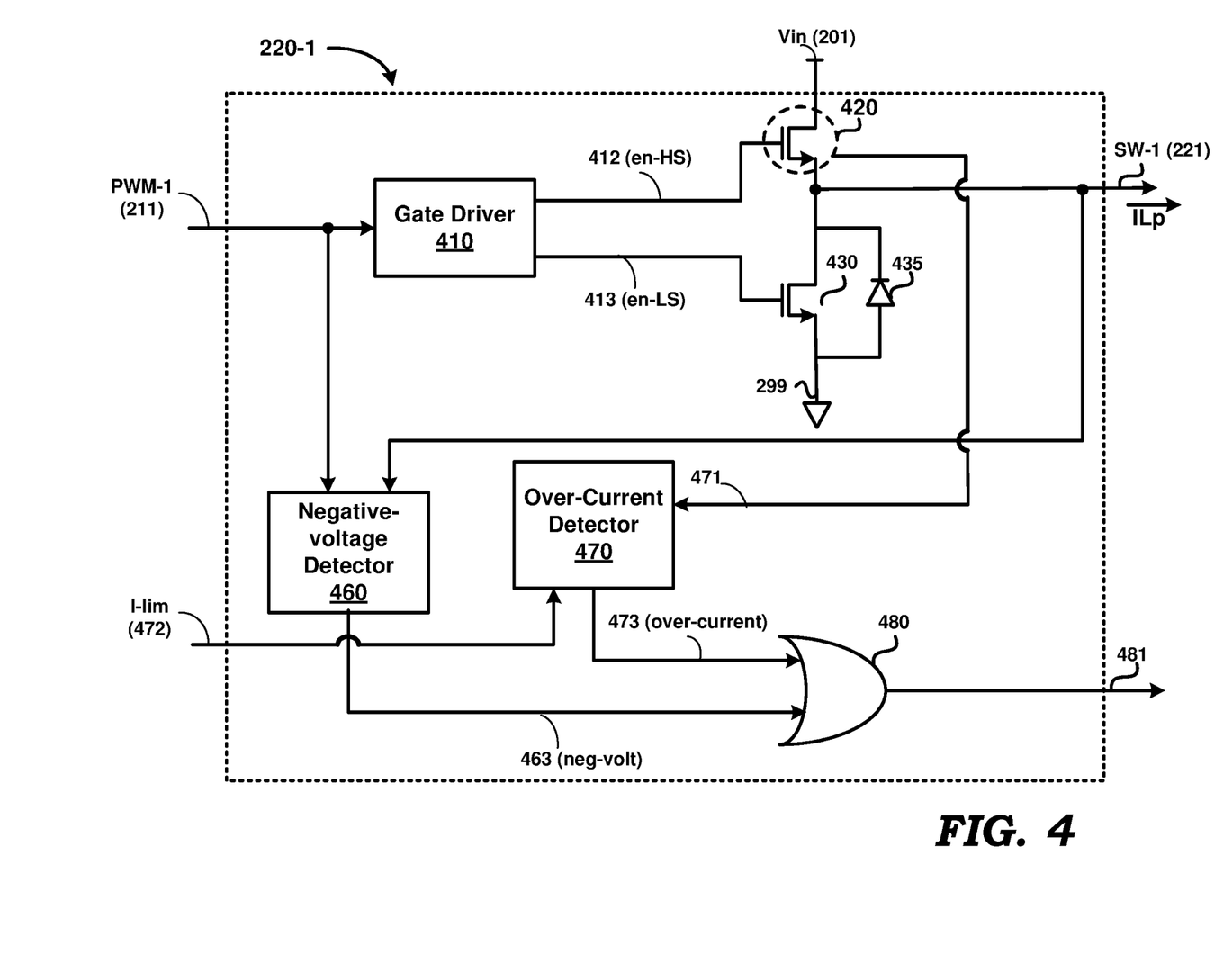
FIG. 4 is a block diagram illustrating the implementation of a smart power stage (SPS) in an embodiment of the present disclosure.

FIG. 4 is a block diagram illustrating the implementation of an SPS in an embodiment of the present disclosure. SPS-1 (220-1) is shown in detail in FIG. 4. The other SPSes of FIG. 2 can also be implemented similar to SPS-1. In the interest of conciseness, only those internal details of the SPS as relevant to the present disclosure are shown in FIG. 4. However, in other embodiments, and in general, an SPS can have more internal circuitry or blocks, such as temperature sensor, bootstrap circuitry, etc.

SPS-1 is shown containing gate driver 410, high-side (HS) switch 420, low-side (LS) switch 430, negative-voltage detector 460, over-current detector 470 and OR gate 480. Also shown in FIG. 4 is body-diode (between source and drain) 435 of LS switch 430. Vin (201) represents the supply source (as also shown in FIG. 2) and node 221-1 represents the switching node SW-1 of power stage 220-1. Each of HS switch 420 and LS switch 430 may be implemented as transistors (typically power transistors). In the example of FIG. 4, both HS switch 420 and LS switch 430 are indicated as N-channel MOSFETs (Metal Oxide Semiconductor Field Effect Transistor). However, other types and combinations of components can also be used to implement switches 420 and 430.

Gate driver 410 receives PWM-1 (211), and in response to the logic level of PWM-1 generates the appropriate voltage to turn ON and turn OFF the corresponding one of HS switch 420 and LS switch 430 in respective intervals 'HS-interval' and 'LS interval' of each cycle of operation indicated by PWM-1. In the example of FIG. 4, when PWM-1 (211) is a logic HIGH (i.e., active/asserted, corresponding to the HS-interval), gate driver 410 generates respective appropriate voltages on paths 412 (en-HS) and 413 (en-LS) to switch ON MOSFET 420 and switch OFF MOSFET 430. When PWM-1 (211) is a logic LOW (inactive/de-asserted, corresponding to the LS-interval), gate driver 410 generates respective appropriate voltages on paths 412 and 413 to switch OFF MOSFET 420 and switch ON MOSFET 430. When power stage is to be in a 'non-driven' state, PWM-1 is a high-impedance (Hi-Z). Consequently, both of HS switch 420 and LS switch 430 are OFF.

Over-current detector 470 operates to determine if the inductor-current (the current through the primary winding (225-1) of transformer (230-1) connected to SPS-1 exceeds a maximum allowed or expected magnitude. Such information (i.e., over-current condition) can be obtained from the voltage across HS switch 420 in a known way, and over-current detector is shown symbolically receiving such voltage on path 471. Over-current detector compares receives current I-lim 472 (or information/voltage indicative of the current) representing the maximum allowed/expected inductor-current. I-lim 472 may be received from phase controller 210 or may be set (hardwired) at the time of design within SPS-1 in a known way. Based on voltage 471 and I-lim 472, SPS-1 generates logic signal 473 indicating whether an over-current condition exists or not. If an over-current condition exists, over-current detector 470 asserts logic signal 473 to HIGH. Otherwise, over-current detector 470 maintains signal (473) in a de-asserted (LOW) state. Over-current detector 470 may be implemented in a known way.

Negative-voltage detector 460 operates to detect whether the voltage at 'switching node' SW-1 (221) is negative (with respect to ground 299) or not. Negative-voltage detector 460 is shown connected to node SW-1 (221) as well as 211 (PWM-1). When SPS-1 is not in use to generate Vout (240), i.e., SPS-1 is to be in the non-driven state, PWM-1 (211) is set to hi-Z by phase controller 210. When PWM-1 is at hi-Z, if negative-voltage detector (460) detects that the voltage at SW-1 is negative, then negative-voltage detector (460) asserts (for example, to logic HIGH) logic signal 463 (neg-volt) to indicate that voltage at node SW-1 is negative. When voltage SW-1 is non-negative, negative-voltage detector (460) de-asserts neg-volt (463). When PWM-1 is not at hi-Z, negative-voltage detector (460) maintains neg-volt (463) in the de-asserted state.

Although not shown in FIG. 4, a deglitching circuit (de-glitcher) may be provided in the path between negative-voltage detector 460 and OR gate 480 to prevent glitches in neg-volt signal 463. De-glitching may be necessary to ensure prevent spurious detections from block 460 from being propagated to OR gate 480.

OR gate 480 receives signals on paths 463 (neg-volt) and 473 (over-current) and generates binary signal 481 that represents the result of a logical OR operation on the two received (binary) signals. Thus, when either of or both of signals 463 and 473 is in an asserted state, OR gate 480 asserts (e.g., to logic HIGH) logic signal 481. Otherwise, the logic signal 481 is in the de-asserted state. The state of logic signal 481 can be transmitted in a convenient way from SPS-1 to phase controller 210. As examples, logic signal 481 may be provided to phase controller 210 via pin/path PWM-1, CS-1 or other pins of SPS-1 that connect to phase controller 210.

As noted above, TLVR 110 operates in two modes—a normal mode and a fault-detection mode. In the normal mode of operation, phase controller 210 sets one or more of PWM signals 211 to logic HIGH at corresponding time durations to cause TLVR 110 to generate the desired regulated supply voltage on node Vout (240). In the fault-detection mode of operation of TLVR 110, phase controller 210 sets PWM signal of one of the SPSes (e.g., SPS 220-1) to logic HIGH and maintains (or sets) PWM signals of the remaining SPSes (220-2 to 220-6) to hi-Z state. Phase controller 210 may then observe/sense the logic levels of the outputs 481 of the OR gates (similar to OR gate 480 of FIG. 4) in the corresponding time duration. Phase controller 210 then sets the PWM signal of a next one of the SPSes to logic HIGH while maintaining the PWM signal to the other SPSes in HI-Z state, and again sense the outputs of the OR gates of the respective stages in the corresponding time duration.

In an embodiment of the present disclosure, TLVR 110, and therefore phase controller 210 and the SPSes operate in the fault-detection mode, for example, upon power-up or RESET of the TLVR. Upon completing the operations of the fault-detection mode, TLVR 110 may transition to the normal mode. Alternatively, the transition can be triggered by an external signal such as one from a processor/CPU that is to be powered by TLVR 110, or from a user-input.

Currents and voltages at corresponding nodes of a pair of power stages in the presence of an example fault condition are briefly illustrated next with reference to FIGS. 5 and 6.

6. Driven and Non-Driven Power Stages

Figure 5:
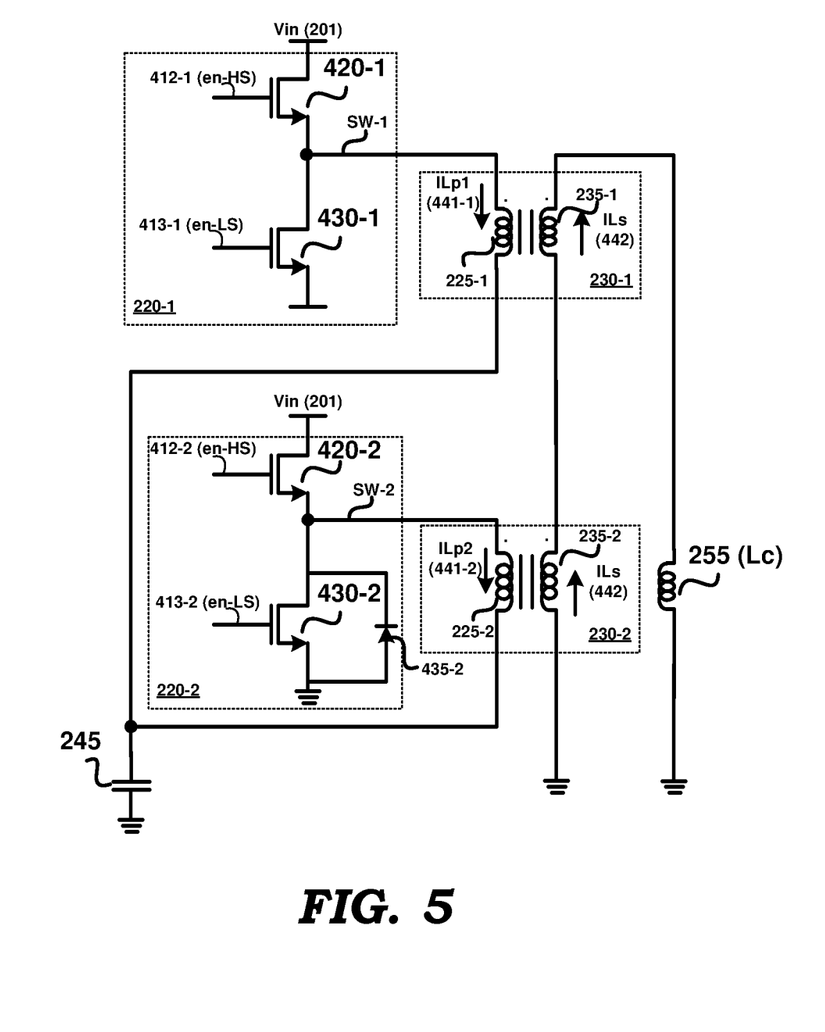
FIG. 5 is a block diagram depicting two power stages, in an embodiment of the present disclosure.

FIG. 5 is a block diagram showing SPSes 220-1 and 220-2 and the corresponding transformers and compensation inductor of TLVR 110. In the interest of clarity and ease of description, only two SPSes are shown in FIG. 5, which is shown containing SPS-1 (220-1), SPS-2 (220-2), transformers 230-1 and 230-2, capacitor 245 and compensation inductor 255. Only portions of SPSes 220 as relevant to the understanding of fault-detection mode are depicted in FIG. 5. Other blocks (e.g., blocks 410, 460, 470, etc. illustrated in FIG. 4) are not shown here in the interest of conciseness. FIG. 6 depicts example waveforms of voltages at switching nodes SW-1 (221-1) and SW-2 (221-1), and currents ILp1 (441-1) and ILp2 (441-2) through primary windings of transformers 230-1 and 230-2 respectively. SPS-1 is assumed to be the driven phase while SPS-2 is assumed to be the non-driven phase. In the illustrative example, the fault is assumed to cause an over-current condition in driven phase SPS-1. Such over-current can be, for example, due to a shorted secondary winding (corresponding to the driven phase) and a shorted compensation inductor (Lc).

Phase controller 210 sets signal PWM-1 (211-1, not shown in FIG. 5) of SPS 220-1 ('driven' SPS) to logic HIGH and PWM signal of SPS 220-2 ('non-driven' SPS) to hi-Z for a pre-determined time interval starting at time instant t650. Prior to time t650 (FIG. 6B), voltages at nodes SW-1 (221-1) and SW-2 (221-2) are shown to be at zero Volts, and currents ILp1 (441-1) and ILp2 (441-2) are shown to be zero Amperes.

Figure 6:
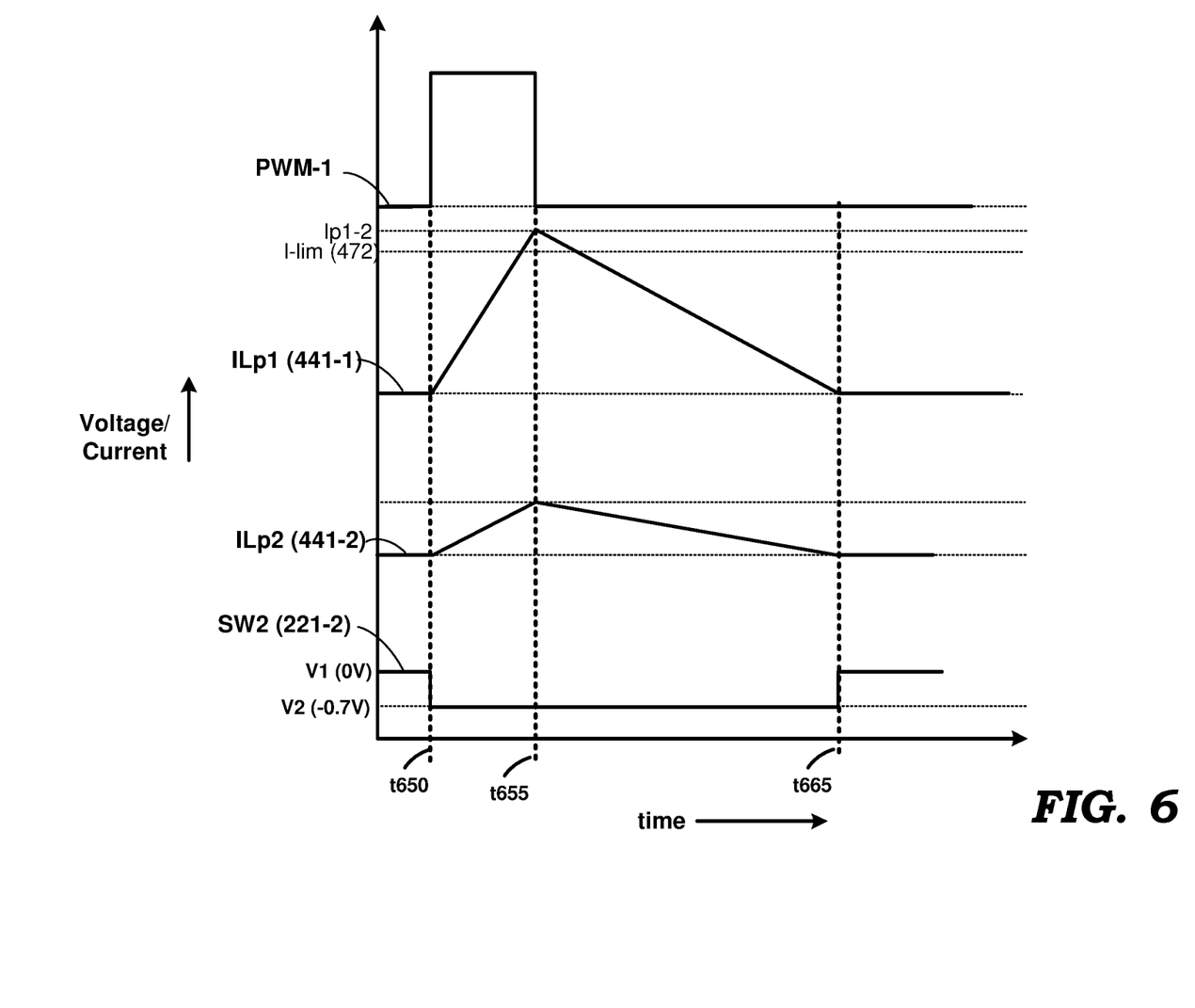
FIG. 6 is a diagram illustrating example waveforms of voltages and currents at various nodes of a power stage when a fault exists, in an embodiment of the present disclosure.

In interval t650-t655 of FIG. 6, with respect to SPS-1 (220-1), the logic HIGH on PWM-1 causes a logic HIGH on path 412-1 (en-HS) and a logic LOW on path 413-1 (en-LS) thereby switching-ON MOSFET 420-1 and switch OFF MOSFET 430-1. Accordingly, voltage at node SW-1 (221-1) is pulled up towards Vin (201) and current ILp1 (441-1) starts flowing (increasing) through primary winding (235-1) of transformer 230-1. Both switches of non-driven phase SPS-2 are OFF.

Due to a fault condition such as a shorted secondary winding 235-1 of transformer 230-1 or a shorted compensation inductor Lc (255), primary current ILp1 (441-1) of SPS-1 is shown as exceeding the maximum limit (due to reduced back emf from the secondary-winding). The peak magnitude of current ILp1 (441-1) flowing through primary winding (235-1) of transformer 230-1 is indicated as Ip1-2, which exceeds the maximum limit I-lim (472).

With respect to the non-driven phase SPS-2 (220-2), current ILp1 (441-1) induces current in secondary winding (235-1) of transformer 230-1 and thus the secondary-loop. The induced secondary current flows through secondary winding (235-2) of transformer (230-2) of non-driven SPS (220-2), thereby inducing current ILp2 (441) in primary winding (225-2) of transformer 230-2 associated with SPS-2 (220-2). Voltage at SW node (221-2) of non-driven phase SPS-2 (220-2) becomes negative.

The combination of OC condition of SPS-1 and the negative voltage at SW node of SPS2-2 in the interval (t650-t655), and more specifically the OC condition of SPS-1, indicates a fault in the secondary-loop. Accordingly, phase controller 210 may indicate the identified fault, for example, by activating an audio or visual signal of an output unit (not shown) either in TLVR or external to TLVR, to indicate a fault to a user. Further, phase controller 210 may mark the power stage with the faulty secondary winding as unusable and maintain it in an unused state, not employing the faulty power stage when generating output voltage Vout.

Figure 7:
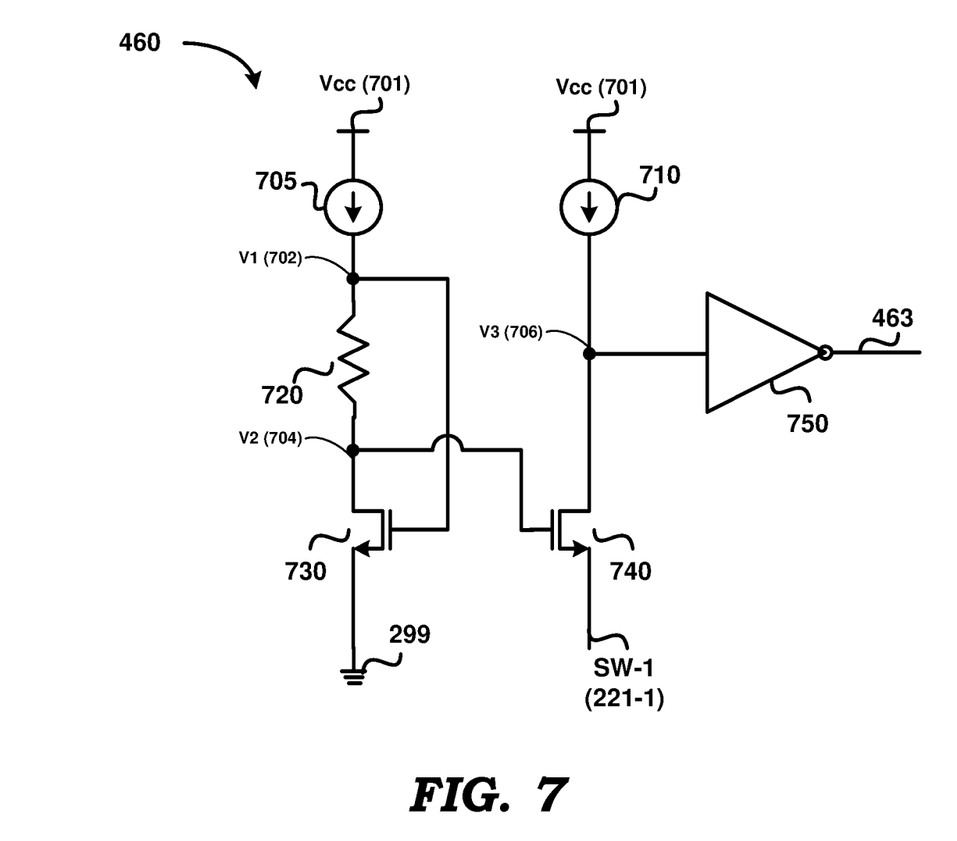
FIG. 7 is a block diagram of a negative-voltage detector used in a power stage of a TLVR, in an embodiment of the present disclosure.

The description is continued to illustrate an example implementation of negative-voltage detector 460 in an embodiment of the present disclosure.

7. Negative-Voltage Detector

FIG. 7 is a block diagram of a negative-voltage detector implemented in a power stage, in an embodiment of the present disclosure. Negative-voltage detector 460 is shown containing current sources 705, 710, resistor 720, N-channel MOSFETs 730 and 740, and inverter 750. Vcc (701) represents a supply voltage (e.g., 3.3V) received from a source external to SPS 220-1 (for example from phase controller 210). Magnitude of voltage V1 (702) equals (gate-source) threshold voltage (Vt1) of transistor 730 plus a small voltage, Vdelta1 (by which the voltage at gate of transistor 730 exceeds Vt1).

Due to the voltage drop (Vdelta2) across resistor 720, gate voltage (V2, 704) of transistor 740 will be equal to V1 (702) minus Vdelta2. The magnitude of resistor 720 is designed such that V2 (704) is close to (gate-source) threshold voltage (Vt2) of transistor 740. In an embodiment, V2=Vt2 minus 0.1V.

Thus, when voltage SW-1 is non-negative (equal to or greater than zero Volts), transistor 740 is switched OFF, and output 463 of inverter 750 is a logic LOW. However, when SW-1 (221-1) is negative, transistor 740 is switched ON, and output 463 of inverter 750 is a logic HIGH.

Although the illustrative embodiment is shown employing the circuit of FIG. 7 in order to detect negative voltage at the SW node, it may be appreciated that alternative embodiments may employ different circuit(s) for negative-voltage detection.

8. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 4, 5 and 7, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A trans-inductor voltage regulator (TLVR) to generate a regulated supply voltage on a supply node from an input voltage at an input node, said TLVR comprising:
    a phase controller to generate a plurality of control signals;
    a compensation inductor;
    a plurality of transformers; and
    a plurality of power stages, each power stage having a switching (SW) node and operable to couple said input node via said switching node to said supply node in a corresponding time duration when a respective control signal of said plurality of control signals is in a first state and decouple said input node from said supply node when said respective control signal is in a second state or a high-impedance (Hi-Z) state,
    wherein each of said plurality of power stages is coupled to one end of a primary winding of a respective transformer of said plurality of transformers, with the other end of the primary winding being coupled to said supply node,
    wherein the secondary windings of said plurality of transformers and said compensation inductor form a secondary-loop between a pair of constant reference potential terminals,
    wherein, in a normal mode of operation:
        said phase controller operates to drive each of said plurality of control signals to said first state at corresponding time durations to provide said regulated supply voltage on said supply node,
    wherein, in a fault-detection mode of operation:
        said phase controller operates to drive a first power stage to an ON state and to place a second power stage in an OFF state in a first duration,
        wherein, if in said first duration, said first power stage supplies a current less than a maximum threshold, and if a voltage at said switching node of said second power stage is negative, said phase controller determines that no faults exist in said secondary-loop, and wherein said phase controller determines that one or more faults exist in said secondary-loop otherwise.

2. The TLVR of claim 1, wherein said phase controller operates to place said first power stage to an OFF state and to drive said second power stage to an ON state in a second duration following said first duration,
    wherein, if in said second duration, said second power stage supplies a current less than said maximum threshold, and if a voltage at said switching node of said first power stage is negative, said phase controller determines that no faults exist in said secondary-loop, and wherein said phase controller determines that one or more faults exist in said secondary-loop otherwise.

3. The TLVR of claim 2, wherein said one or more faults comprise a short across the secondary winding of said respective transformer of said first power stage, a short across the secondary winding of said respective transformer of said second power stage, and a short across said compensation inductor.

4. The TLVR of claim 2, wherein each power stage of said plurality of power stages comprises:
    a high-side switch and a low-side switch coupled at said SW node, and together operable to provide said regulated supply voltage; and
    a driver block operable to:
        drive a control terminal of said high-side switch by a high-side drive signal, said high-side drive signal derived from said control signal to cause said high-side switch to be ON or OFF;
        drive a control terminal of said low-side switch by a low-side drive signal, said low-side drive signal derived from said control signal to cause said low-side switch to be ON or OFF,
    wherein:
        when said control signal is in said first state, said high-side drive signal is a logic HIGH and said low-side drive signal is a logic LOW, said high-side switch is ON and said low-side switch is OFF,
        when said control signal is in said second state, said high-side drive signal is a logic LOW and said low-side drive signal is a logic HIGH, said high-side switch is OFF and said low-side switch is ON,
        when said control signal is in said Hi-Z state, both of said high-side drive signal and said low-side drive signal are logic LOW and said high-side switch and said low-side switch are OFF.

5. The TLVR of claim 2, wherein said fault-detection mode of operation is enabled upon power-up or RESET of said TLVR.

6. The TLVR of claim 2, wherein, upon determining that a fault exists in said secondary-loop, said phase controller 210 maintains the corresponding power stages in an unused state while generating said output voltage in said normal mode.

7. The TLVR of claim 2, wherein each of said first stage and said second stage comprises:
    an over-current detector to check whether a current exceeding a maximum threshold is drawn from the power stage;
    a negative voltage detector to determine whether a voltage at said SW node of the power stage is negative.

8. A power stage of a multi-phase trans-inductor voltage regulator (TLVR), said power stage comprising:
    a high side switch and a low side switch connected in series at a switching (SW) node, said high-side switch and said low-side switch being connected in series between a power source and a constant reference potential;
    a gate driver to drive said high-side switch and said low-side switch alternately on and off in a first duration, wherein said gate driver maintains both of said high-side switch and said low-side switch in an off state in a second duration;
    an over-current detector to check whether a current exceeding a maximum threshold is drawn from said power source by said high-side switch in said first duration; and
    a negative voltage detector to determine whether a voltage at said SW node is negative in said second duration,
    wherein said TLVR comprises another power stage in which another high side switch and another low side switch are driven alternately on and off in said second duration.

9. The power stage of claim 8, wherein said TLVR further comprises a plurality of transformers, with each transformer being associated with a corresponding power stage and having a primary winding and a secondary winding, wherein the secondary windings are connected in series along with a compensation inductor to form a secondary-loop of said TLVR, wherein either of said current exceeding said maximum threshold in said first duration or a non-negative voltage at said SW node in said second duration indicates a fault in the secondary-loop of said TLVR.

10. The power stage of claim 9, wherein said negative-voltage detector comprises:

a resistor;

an inverter;

a first current source coupled between a first constant reference potential and a first end of said resistor;

a first transistor, wherein a first current terminal of said first transistor is coupled to a second end of said resistor, wherein a second current terminal of said first transistor is coupled to a second constant reference potential, wherein a control terminal of said first transistor is coupled to the junction of said first current source and said first end of said resistor;

a second transistor, wherein a control terminal of said second transistor is coupled to said second end of said resistor, wherein a first current terminal of said second transistor is coupled to an input of an input of said inverter, wherein a second current terminal of said second transistor is coupled to said SW node; and a second current source coupled between said first constant reference potential and said input of said inverter, wherein a logic HIGH at an output of said inverter indicates that said voltage at said switching node is negative, and a logic LOW at said output of said inverter indicates otherwise.

\* \* \* \* \*